(12) United States Patent
Arroyo

(10) Patent No.: US 7,853,424 B2
(45) Date of Patent: Dec. 14, 2010

(54) METHOD OF USING A BIPOLAR TRANSISTOR AS A SELF-CALIBRATED THERMOMETER AND/OR TEMPERATURE SENSOR

(76) Inventor: Jaime Mimila Arroyo, Av. Instituto Politecnico Nacional 2508, Colonia San Pedro Zacatenco, Mexico, D.F. (MX) CP 07360

( * ) Notice: Subject to any disclaimer, the term of this patent is extended or adjusted under 35 U.S.C. 154(b) by 171 days.

(21) Appl. No.: 11/989,685

(22) PCT Filed: Jul. 24, 2006

(86) PCT No.: PCT/MX2006/000075
§ 371 (c)(1),
(2), (4) Date: Jan. 28, 2008

(87) PCT Pub. No.: WO2007/013790
PCT Pub. Date: Feb. 1, 2007

(65) Prior Publication Data
US 2009/0150110 A1    Jun. 11, 2009

(30) Foreign Application Priority Data
Jul. 27, 2005   (MX) .................. PA/A/2005/007947

(51) Int. Cl.
*G01K 15/00* (2006.01)
(52) U.S. Cl. ........................................................ 702/99
(58) Field of Classification Search .................. 702/99
See application file for complete search history.

(56) References Cited

U.S. PATENT DOCUMENTS

| | | | |
|---|---|---|---|
| 3,812,717 A | 5/1974 | Miller et al. | |
| 5,334,929 A | 8/1994 | Schade, Jr. | |
| 5,961,215 A | 10/1999 | Lee et al. | |
| 6,019,508 A | 2/2000 | Lien | |
| 6,028,472 A | 2/2000 | Nagumo | |
| 6,286,996 B1 | 9/2001 | Molander | |
| 6,554,469 B1 | 4/2003 | Thomson et al. | |
| 6,674,185 B2 | 1/2004 | Mizuta | |
| 6,882,213 B2 | 4/2005 | Kim | |
| 6,890,097 B2 | 5/2005 | Tanaka | |
| 7,010,440 B1 | 3/2006 | Lillis et al. | |
| 7,082,377 B1 | 7/2006 | Aslan et al. | |

(Continued)

OTHER PUBLICATIONS

T. C. Verster, "Dual Transitor as Thermometer Probe", National Research Institute for Mathematical Sciences, Sep. 23, 1968, pp. 174-175.

(Continued)

*Primary Examiner*—Tung S Lau
(74) *Attorney, Agent, or Firm*—Jordan and Hamburg LLP

(57) ABSTRACT

This invention relates a method to use a bipolar transistor as temperature sensor and/or self-calibrated thermometer which is immune to errors generated by parasitic elements as resistances and ideality factors and their evolution. In this invention the product of the collector current values $I_{Cmi}(V_{EBmi})$ as a function of the emitter-base forward bias voltage $V_{EBim}$; $I_{Ci}(V_{EBi}) \times \exp(-qV_{EBi}/kT_0)$ is plotted as a function of the emitter-base forward bias voltage $V_{EBim}$. $T_0$ is a parameter which ensures that a region of the above mentioned plot results with a slope equal to zero, while simultaneously represents the transistor absolute temperature at the moment at which the collector current $I_{Cmi}$ is obtained as a function of the forward bias $V_{EBmi}$.

7 Claims, 10 Drawing Sheets

U.S. PATENT DOCUMENTS

Figure 1:
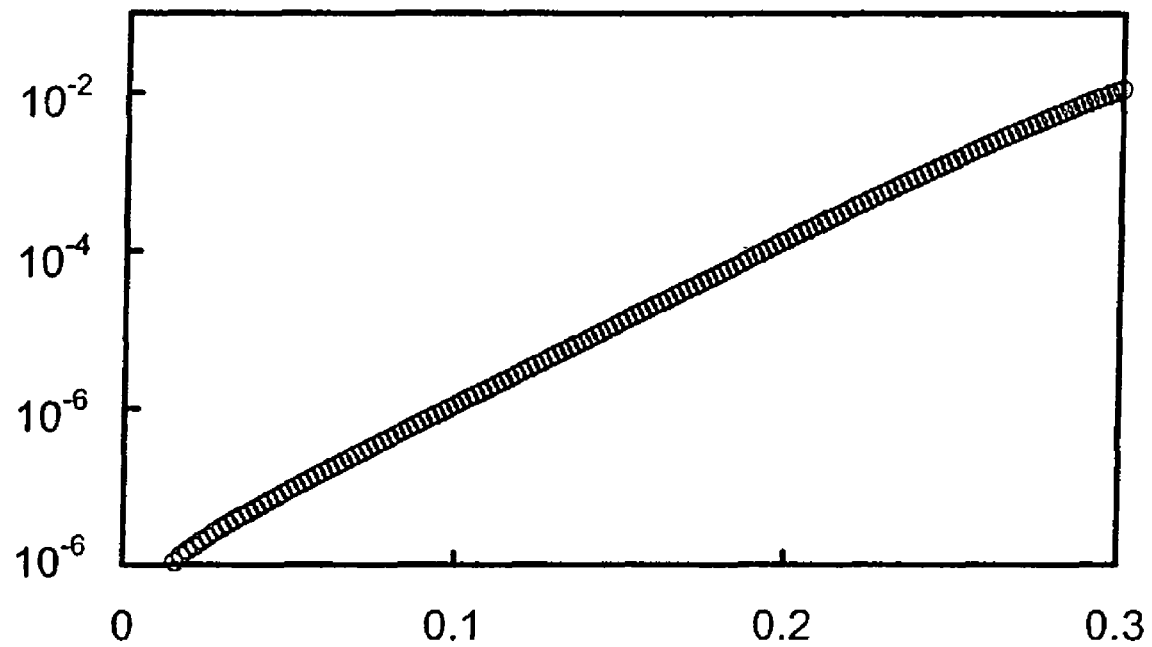

| | | | |
|---|---|---|---|
| 7,170,275 B1 | 1/2007 | Falik | |
| 7,237,863 B2 | 7/2007 | Takayanagi | |
| 7,356,420 B2 * | 4/2008 | Vilanova et al. | 702/22 |

OTHER PUBLICATIONS

Michiel A. P. Pertijs, et al., "A CMOS Smart Temperature Sensor With a 3σ Inaccuracy of ±0.1°C From -55°C to 125°C", IEEE Journal of Solid-State Circuits, vol. 40, No. 12, Dec. 2005, pp. 2805-2815.

Mike Tuthill, "A Switched-Current, Switched-Capacitor Temperature Sensor in 0.6-µm CMOS", IEEE Journal of Solid-State Circuits, vol. 33, No. 7, Jul. 1998, pp. 1117-1122.

R. A. Bianchi, et al., "CMOS compatible temperature sensor based on the lateral bipolar transistor for very wide temperature range applications", Sensors and Actuators A 71 (1998), pp. 3-9.

Michael P. Timko, "A Two-Terminal IC Temperature Transducer", IEEE Journal of Solid State Circuits, vol. SC-11, No. 6, Dec. 1976, pp. 784-788.

G. C. M. Meijer, et al.; "An Accurate Biomedical Temperature Transducer with On-Chip Microcomputer Interfacing", IEEE Journal of Solid-State Circuits, vol. 23, No. 6, Dec. 1988, pp. 1405-1410.

Michiel Pertijs, et al.; "A CMOS Temperature Sensor with a 3σInacuracy of ±0.5°C from -50°C to 120°C", ISSCC 2003, Session 11, Microsensors and Biomems, Paper 11.5, 10 Pages.

Michiel Pertijs, et al.; "A CMOS Temperature Sensor with a 3σInaccuracy of ±0.1°C from -55°C to 125°C". ISSCC 2005, Session 13, Sensors, Paper 13.1, 3 Pages.

Christopher Poirier, et al.; "Power and Temperature Control on a 90nm Itanium®-Family Processor", ISSCC 2005, Session 16, Clock Distribution and Power Management, Paper 16.7, pp. 304-305.

Chun-Chi Chen, et al.; "A Time-to-Digital-Converter-Based CMOS Smart Temperature Sensor", IEEE 2005, pp. 560-563.

Chih-Peng Liu, et al.; "A CMOS Voltage Reference with Temperature Sensor using Self-PTAT Current Compensation", IEEE 2005, pp. 39-42.

Y. B. Acharya, et al.; "Study on the temperature sensing capability of a light-emitting diode", Rev. Sci. Instrum. 68 (12), Dec. 1997, American Institute of Physics, pp. 4465-4467.

Gerard C. M. Meijer, et al.; "Temperature Sensors and Voltage References Implemented in CMOS Technology", IEEE Sensors Journal, vol. 1, No. 3, Oct. 2001, pp. 225-234.

Michiel A. P. Pertijs, et al.; "Transistor Temperature Measurement for Calibration of Integrated Temperature Sensors", IEEE Instrumentation and Measurement Technology Conference, May 2002, pp. 755-758.

Jung Pill Kim, et al.; "A Low-Power 256-Mb SDRAM With an On-Chip Thermometer and Biased Reference Line Sensing Scheme", IEEE Journal of Solid-State Circuits, vol. 38, No. 2, Feb. 2003, pp. 329-337.

Michiel A. P. Pertijs, et al.; A CMOS Smart Temperature Sensor With a 3σ Inaccuracy of ± 0.5°C From -50°C to 120°C, IEEE Journal of Solid-State Circuits, vol. 40, No. 2, Feb. 2005, pp. 454-461.

Chun-Chi Chen, et al.; "An Accurate CMOS Time-to-Digital-Converter-Based Smart Temperature Sensor with Negative Thermal Coefficient", IEEE 2005, pp. 849-852.

P. Krummenacher, et al.; "Smart Temperature Sensor in CMOS Technology", Sensors and Actuators, A21-A23 (1990), pp. 636-638.

F. R. Rieduk, et al.; "An integrated absolute temperature sensor with sigma-delta A-D conversion", Sensor and Actuators A, 34 (1992), pp. 249-256.

Anton Bakker, et al.; "Micropower CMOS Temperature Sensor with Digital Output", IEEE Journal of Solid-State Circuits, vol. 31, No. 7, Jul. 1996, pp. 933-937.

P.S. Iskrenovic, et al.; "Optimal operating conditions of the impulse diode thermometer", Review of Scientific Instruments, vol. 69, No. 8, Aug. 1998, pp. 2935-2938.

Olfa Kanoun; "Modeling the P-N Junction I-U Characteristic for an Accurate Calibration-Free Temperature Measurement", IEEE Transactions on Instrumentation and Measurements, vol. 49, No. 4, Aug. 2000, pp. 901-904.

Steve P. Marsh; "Direct Extraction Technique to Derive the Junction Temperature of HBT's Under High Self-Heating Bias Conditions", IEEE Transactions on Electron Devices, vol. 47, No. 2, Feb. 2000, pp. 288-291.

Yang-Hua Chang, et al.; "Measurement of Junction Temperature in Heterojunction Bipolar Transistors (Invited)", IEEE 2000, 4 Pages.

N. S. Boltovets, et al.; "Ge-film resistance and Si-based diode temperature microsensors for cryogenic applications", Sensors and Actuators A 92, (2001), pp. 191-196.

Yu. M. Shwarts, et al.; "Peculiarities of injection phenomena in heavily doped silicon structures and development of radiation-resistant diode temperature sensors", Semiconductor Physics, Quantum Electronics & Optoelectronics, 2003, vol. 6, No. 2, pp. 233-237.

David L. Blackburn; "Temperature Measurements of Semiconductor Devices—A Review", Contribution of the National Institute of Standards and Technology, 20th Semi-Therm Symposium, 2004 IEEE, 11 Pages.

Dr. John W. Sofia; "Electrical temperature measurement using semiconductors", Electronics Cooling, 6 Pages, Jan. 1997.

Mohua Bose, et al.; "Study of forward characteristics of a cryogenic temperature sensor diode", Rev. Sci. Instrum. 67 (12), Dec. 1996, American Institute of Physics, pp. 4176-4178.

P.S. Iskrenovic, et al.; "Assortment of optimal conditions for running the impulse diode thermometer", Rev. Sci. Instrum. 65 (2), Feb. 1994, American Institute of Physics, p. 477-480.

P.S. Iskrenovic, et al.; "Temperature measurement by means of semiconductor diode in pulse mode", Rev. Sci. Instrum. 63 (5), May 1992, American Institute of Physics, pp. 3182-3184.

G. C. M. Meijer, et al., "An Accurate Biomedical Temperature Transducer with On-Chip Microcomputer Interfacing", IEEE Journal of Solid-State Circuits, vol. 23, No. 6, Dec. 1988, pp. 1405-1410.

John K. Krause, et al.; "Measurement system induced errors in diode thermometry", Rev. Sci. Instrum. 57 (4), Apr. 1986, American Institute of Physics, pp. 661-665.

A. A. Felimban et al.; "Transistors as absolute thermometers", Apparatus and Techniques, Nov. 1973, 2 Pages.

B. G. Cohen, et al.; "GaAs p-n Junction Diodes for Wide Range Thermometry", The Review of Scientific Instruments, vol. 34, No. 10, Oct. 1963, pp. 1091-1093.

Michiel A. P. Pertijs, et al.; "Bitstream Trimming of a Smart Temperature Sensor", IEEE 2004, pp. 904-907.

Michiel A. P. Pertijs, et al.; "Precision Temperature Measurement Using CMOS Substrate PNP Transistors", IEEE Sensors Journal, vol. 4, No. 3, Jun. 2004, pp. 294-300.

Zeng Jianping, et al.; "CMOS Digital Integrated Temperature Sensor", IEEE 2005, pp. 310-313.

Michiel A. P. Pertijs; "Precision Interface Electronics for a CMOS Smart Temperature Sensor", IEEE 2005, pp. 943-946.

Gerard C. M. Meijer; "A Low-Power Easy-to-Calibrate Temperature Transducer", IEEE Journal of Solid-State Circuits, vol. SC-17, No. 3, Jun. 1982, pp. 609-613.

Gerard C. M. Meijer; "An IC Temperature Transducer with an Intrinsic Reference", IEEE Journal of Solid-State Circuits, vol. SC-15, No. 3, Jun. 1980, pp. 370-373.

Gerard de Haan, et al.; "An Accurate Small-Range IC Temperature Transducer", IEEE Journal of Solid-State Circuits, vol. SC-15, No. 6, Dec. 1980, pp. 1089-1091.

Gerard C. M. Meijer, et al.; "Measurement of the Temperature Dependence of the $I_c(V_{be})$ Characteristics of Integrated Bipolar Transistors", IEEE Journal of Solid-State Circuits, vol. SC-15, No. 2, Apr. 1980, pp. 237-240.

J. E. Pallett; "An Electrical Thermometer", Electronic Engineering, May 1963, pp. 313-315.

J. E. Pallett; "The Transistor as a Temperature-sensing Device in Temperature Control Systems", Electronic Engineering, Jun. 1961, pp. 360-363.

A. G. McNamara; "Semiconductor Diodes and Transistors as Electrical Thermometers", The Review of Scientific Instruments, vol. 33, No. 3, Mar. 1962, pp. 330-333.

J. F. Gibbons, et al.; "A Circuit with Logarithmic Transfer Response over 9 Decades", pp. 378-384, 1964.

Tony Huen; "Semiconductor Diode Low Temperature Thermometer", Notes, 1970, pp. 1368-1369.

Poki Chen, et al.; "A Time-to-Digital-Converter-Based CMOS Smart Temperature Sensor", IEEE Journal of Solid-State Circuits, vol. 40, No. 8, Aug. 2005.

* cited by examiner

METHOD OF USING A BIPOLAR TRANSISTOR AS A SELF-CALIBRATED THERMOMETER AND/OR TEMPERATURE SENSOR

FIELD OF THE INVENTION

The present invention establishes the use of bipolar transistors as self-calibrated thermometers and/or as temperature sensors, and more specifically establishes a method for using a bipolar transistor as a precise self-calibrated thermometer and/or temperature sensor.

BACKGROUND OF THE INVENTION

A well known characteristic of the so called semi-conducting materials is the dependence of their physical properties with their temperature. This is particularly true for electronic devices and/or circuits of any type; discrete, integrated or hybrid, comprising at least a pn junction. By pn junction should be understood a structure of semiconducting materials constituted by two regions of semi-conducting materials, one of P type conductivity and the other of N type conductivity, with their respective electrical access or electrodes. Such temperature dependence remains irrespectively if the said pn junction is obtained by metallurgic doping of each one of the said P and N regions or some how it is just induced, as well as, of the primary intended uses of the said pn junction, such as; rectifier, photodiode, coherent or non coherent light emitting diode (of any wave length), solar cell, bipolar transistor, SCR's, etc. In general, the performance of electronic devices based on semi-conducting materials comprising or not a pn junction, is intrinsically dependent on the temperature at which the corresponding device is being operated. Because of this property, semi-conducting devices discrete or integrated are widely and extensively used as temperature sensors and, when calibrated, as thermometers. Particularly the pn junction or diode is widely used as a thermometer requiring, nevertheless, periodical calibrations.

The current flowing through a p-n junction, I(V) as a function of the forward bias voltage applied to the said p-n junction, V, and for values of the said applied forward bias voltage higher than 3kT, is given by the equation $$I(V)=I_{DS}(T)\times exp[q(V-R_SI)/\eta_D kT]+I_{SR}(T)\times exp[q(V-R_SI)/\eta_r kT]+R_P/(V-IR_S) \quad (1)$$

where the $I_{DS}(T)$ pre-exponential term is the diode diffusion saturation current, which is a function of the temperature; T, at which the diode is operating, q is the electron charge, $R_S$ is the diode parasitic series resistance, $\eta_D$, is the ideality factor for the conduction current mechanism due to the minority carriers diffusion, k is the Boltzmann's constant, $I_{SR}(T)$, another pre-exponential term is the diode recombination saturation current, which is also a function of the temperature T at which the diode is functioning, $\eta_r$, is the ideality factor for the current due to the recombination process in the, so called, diode space charge region, and $R_P$ is the diode parasitic parallel resistance.

In the equation (1), the first term on the right hand side is due to the thermal diffusion of minority carriers in the neutral regions at each side of the p-n junction that have been injected across the junction as a result of the applied forward bias. The second term on the right hand side of the same equation (1), is due to the recombination of both types of carriers; electrons and holes, in the so called space charge region of the p-n junction, and the third term in the same equation (1) is due to a parasitic parallel resistance, the term $(V-IR_S)$ represents the portion of the applied external voltage V, that is effectively applied to the p-n junction and $IR_S$ is the portion of the said applied external voltage V, that drops across parasitic series resistance all sources together; leads, soldering and wires, necessaries to the bias and electrical measurement.

Usually, when the p-n junction diode is used as a temperature sensor is operated in a forward bias region where the first term of the equation (1) is dominant, that is to say, when the other terms can be neglected. Under such operating conditions when through a p-n junction diode flows a constant forward bias current; $I_0$, the forward bias voltage externally applied to maintain that said constant current through the said pn junction diode varies with the temperature according to the equation (2), below $$V(I_0,T)=(\eta_D kT/q)\times ln(I_0/I_{DS}(T))+I_0 R_S \quad (2)$$

Generally, both $I_{DS}$ and $I_{SR}$ depend on the p-n junction design and its manufacture technological process, $R_S$ and $R_P$ are, as well, dependent on the diode's technology and $\eta_D$ and $\eta_r$ should be equal, according to Schockley's p-n junction charge transport model, to 1 and 2 respectively. However, $\eta_D$ and $\mu_r$ are only exceptionally equal to the above said values given by Schockley's model, moreover, there is no model to predict their actual experimental value. Even worst, should be identical diodes from one place to another in the same wafer, rarely have the same $\eta_D$ and $\eta_r$ values. The variation of each one of the above described p-n junction diode charge transport parameters introduce errors in temperature measurements, making necessary a, one to one, p-n junction thermometer calibration. Notwithstanding such drawbacks the p-n junction based thermometers and temperature sensors are widely used in countless applications.

With the aim to reduce the effect of some of the above mentioned problems constituting error sources present in pn junction based thermometers and temperature detectors several propositions have been made. For example, Thomson D. et al., in their American U.S. Pat. No. 6,554,469 propose, in an attempt to reduce the parasitic series resistance effect on the measured temperature value, a method using a transistor emitter-base p-n junction, to realize a set of four current measurements through this p-n junction, followed of some elaborated calculations in which the transistor current gain should be used. However, they neglect the effect of other p-n junction parameters that might introduce errors in the obtained temperature, as the value of the ideality factor, which might depend on the current intensity and variations on it because physical evolution of the device. Such inconvenient is completely absent in our method.

With similar purposes Matsuno Y. et. al., in their American U.S. Pat. No. 6,255,891 propose the use of two bipolar transistors of different emitter areas, as being part of an electronic circuit including comparators and a reference voltage, completely unnecessary in our hereby detailed method.

BRIEF DESCRIPTION OF THE FIGURES AND DRAWINGS

FIG. 1 Graph of the collector current, $I_C$ (ordinate axis) of a commercial Germanium (Ge) bipolar transistor as a function of the emitter-base forward bias, $V_{EB}$, (abscissa axis) in thermal equilibrium with a body whose temperature $T_m$ is to be measured. The room temperature transistor current gain is 199.

Figure 2:
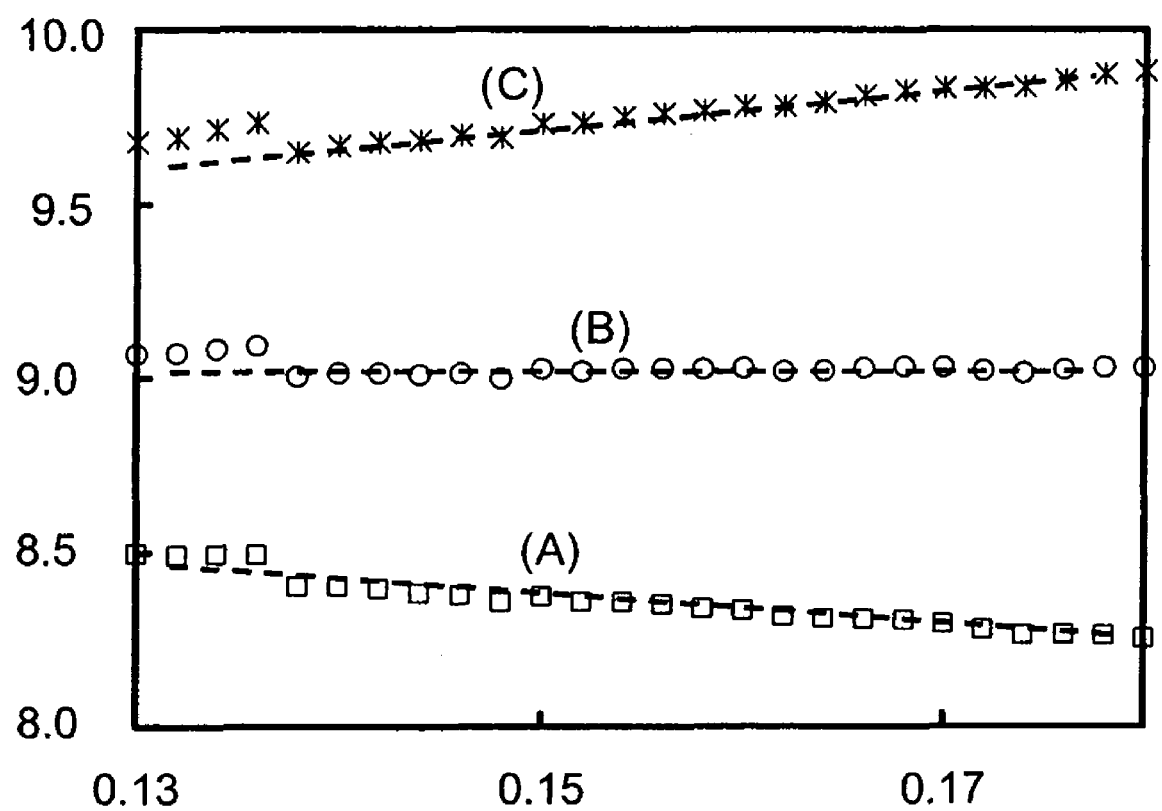

FIG. 2 Graph of the product $I_{Cmi}\times exp(-qV_{EBmi}/kT_a)$ (ordinate axis), using the pair of data $(V_{EBmi}, I_{Cmi})$ of FIG. 1, as a function of the emitter-base forward bias voltage, $V_{EB}$ between emitter and base (abscissa axis), pairs of $(V_{EB}, I_C)$ data obtained while the germanium bipolar transistor was in thermal equilibrium with the body whose temperature is to be measured. The before said product, $I_{Cmi} \times \exp(-qV_{EBmi}/kT_a)$, has been realized and plotted for three different values of the absolute temperature; $T_a$, that should be proposed in equation (5). The used values are; T=238.2 K, curve (A), in the figure, T=240.7 K, curve (B) and T=243.2 K, curve (C), in the figure. The dotted lines in the figure are just to guide the eye. It should be remarked that only the graph of $I_{Cm} \times \exp(-qV_{EBm}/kT_a)$ obtained for $T_a$=240.7 K, posses a slope equal to zero i.e., is parallel to the $V_{EB}$ axis. For the other two temperature proposed values, the graph has a slope different of zero.

Figure 3:
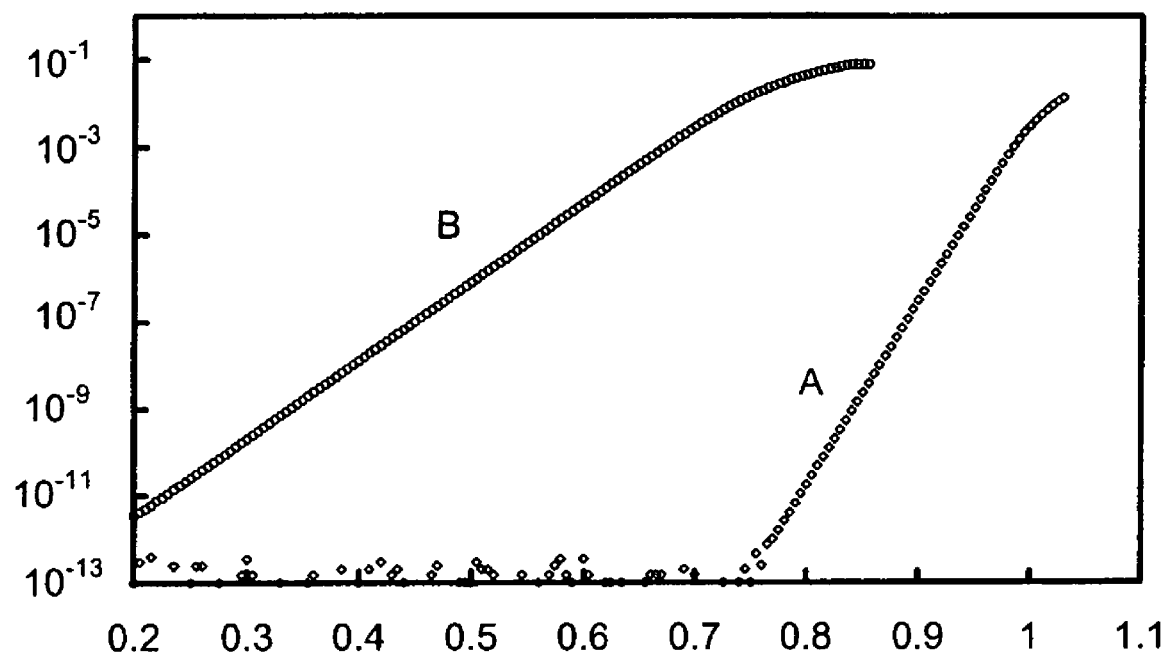

FIG. 3 Graphs of the collector current, $I_C$ (ordinate axis) of a commercial Silicon (Si) bipolar transistor as a function of the emitter-base forward bias, $V_{EB}$, (abscissa axis) for two different operating temperatures of the transistor used as thermometer; 118.74 K, curve (A) in the figure and 279.07 K, curve (B). The transistor current gain at room temperature is 210.

Figure 4:
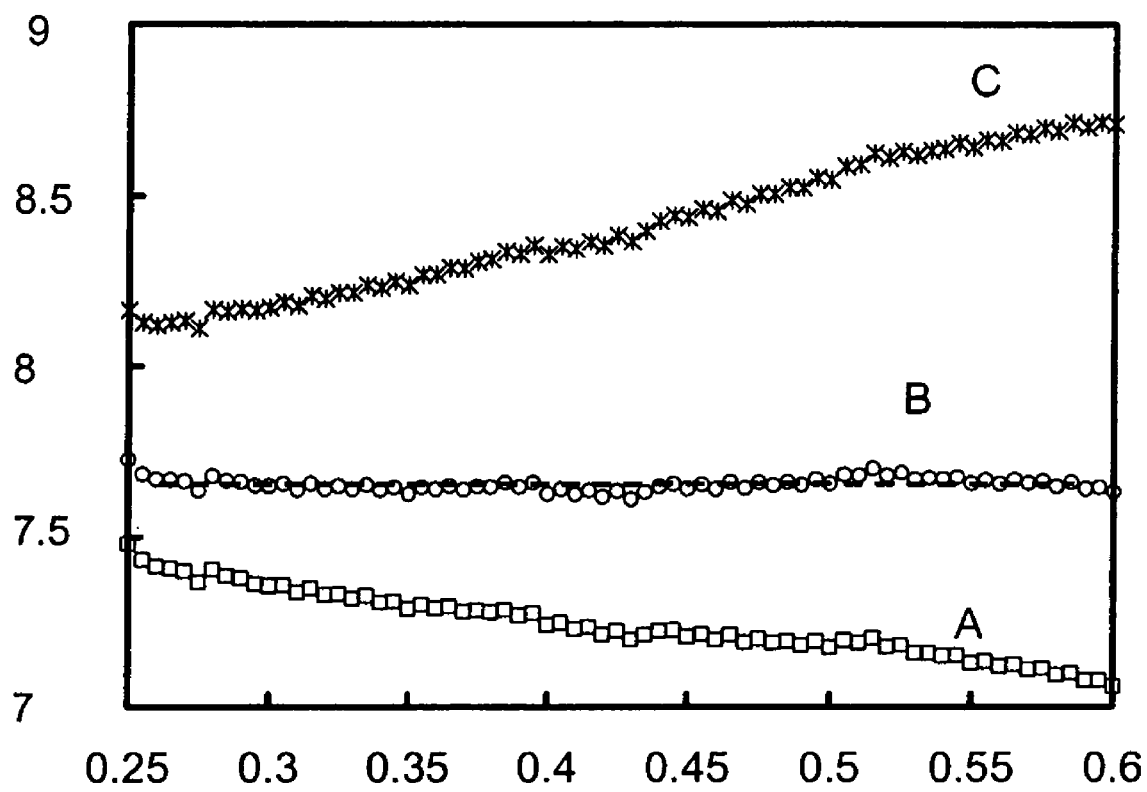

FIG. 4 Graph of the product $I_{Cmi} \times \exp(-qV_{EBmi}/kT_a)$ (ordinate axis) using the pair of data ($V_{EBmi}$, $I_{Cmi}$) of FIG. 3 curve (A), as a function of the emitter-base forward bias voltage, $V_{EB}$, (abscissa axis). Pairs of data obtained while the Silicon bipolar transistor was in thermal equilibrium with the body whose temperature should be measured. The before said product, $I_{Cmi} \times \exp(-qV_{EBmi}/kT_a)$, has been realized and plotted for three different values of the absolute temperature; $T_a$, that should be proposed in equation (5). The used values are; T=117.18 K, curve (A), in the figure, T=118.74 K, curve (B) and T=119.23 K, curve (C), in the figure. The dotted lines in the figure are just to guide the eye. It should be remarked that only the graph of $I_{Cmi} \times \exp(-qV_{EBmi}/kT_a)$ obtained for $T_a$=118.74 K, is parallel to the $V_{EB}$ axis. For the other two temperature proposed values, the graph has a slope different of zero.

Figure 5:
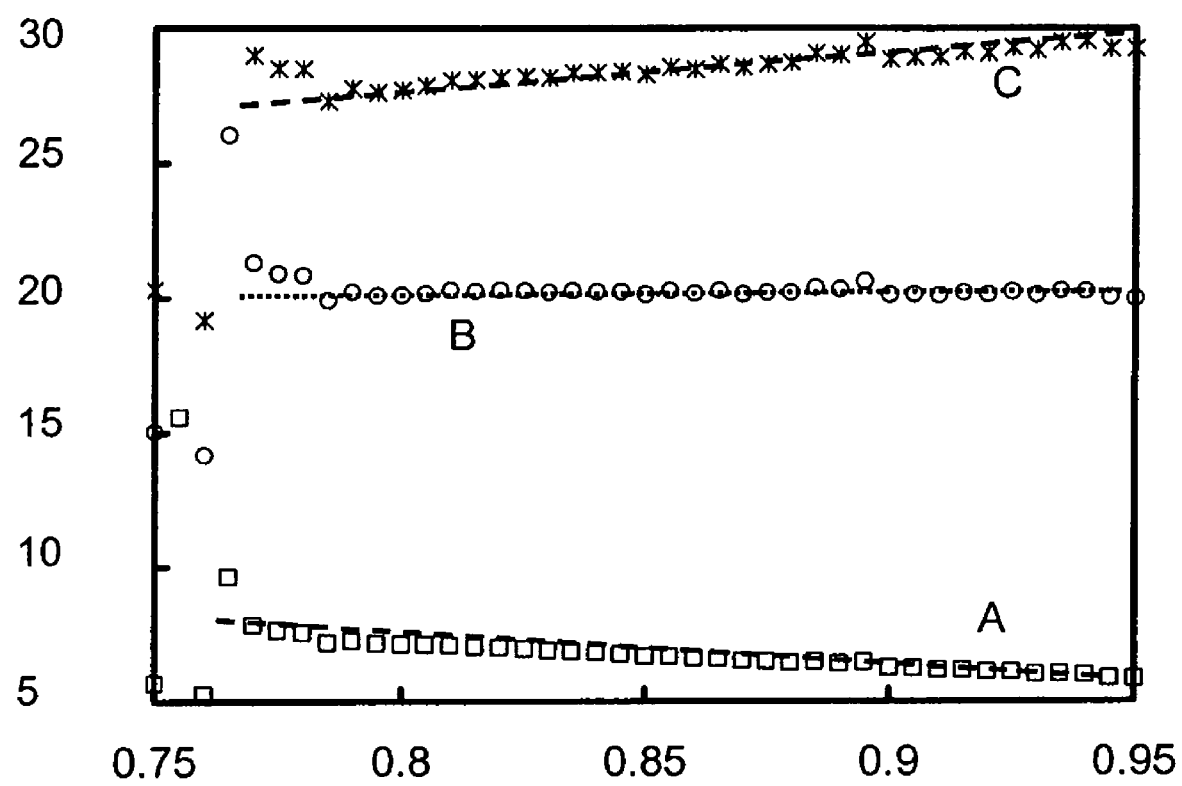

FIG. 5 Graph of the product $I_{Cmi} \times \exp(-qV_{EBmi}/kT_a)$ (ordinate axis) using the pair of data ($V_{EBmi}$, $I_{Cmi}$) of FIG. 3 curve (B), as a function of the emitter-base forward bias voltage, $V_{EB}$, (abscissa axis). Pairs of data obtained while the Silicon bipolar transistor was in thermal equilibrium with the body whose temperature should be measured. For this second temperature to be determined the before said product, $I_{Cmi} \times \exp(-qV_{EBmi}/kT_a)$, has been realized and plotted for three different values of the absolute temperature; $T_a$, that should be proposed in equation (5). The used values are; T=280.55 K, curve (A), in the figure, T=279.07 K, curve (B) and T=278.2 K, curve (C), in the figure. The dotted lines in the figure are just to guide the eye. It should be remarked that only the graph of $I_{Cmi} \times \exp(-qV_{EBmi}/kT_a)$ obtained for $T_a$=279.07 K, is parallel to the $V_{EB}$ axis. For the other two temperature proposed values, the graph has a slope different of zero.

Figure 6:
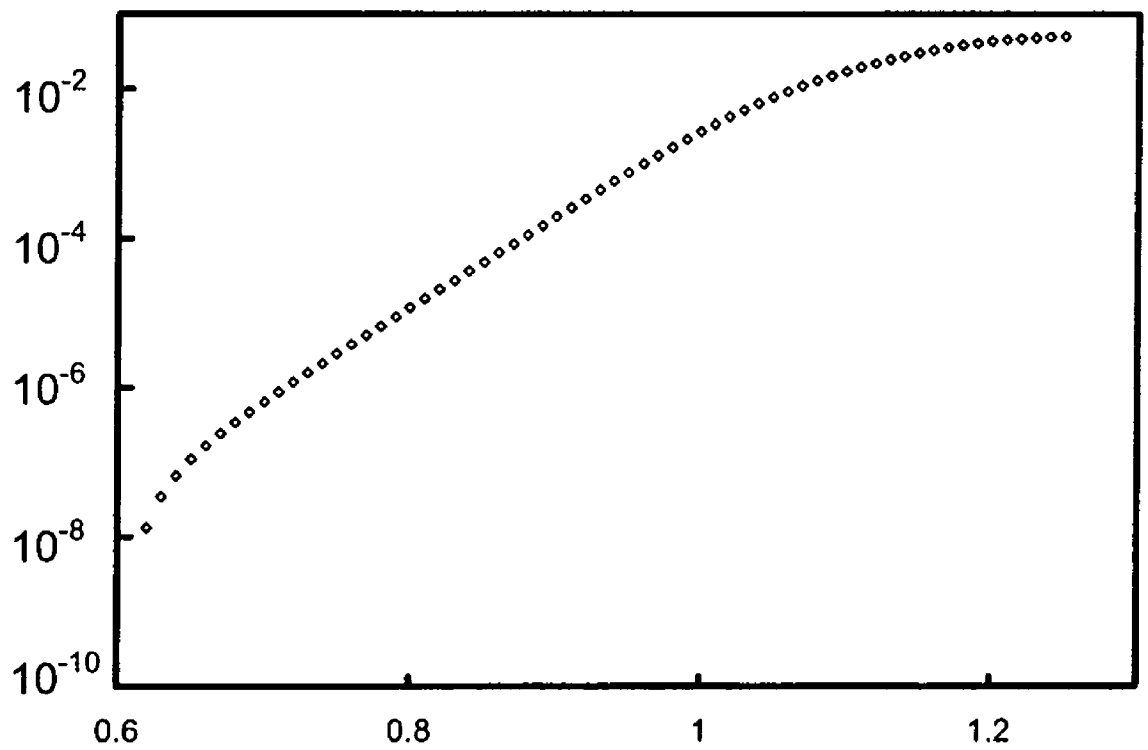

FIG. 6 Graph of the collector current, $I_C$ (ordinate axis) of a commercial NPN GaInP/GaAs hetero-junction bipolar transistor as a function of the emitter-base forward bias, $V_{EB}$, (abscissa axis). The transistor current gain at room temperature is 120.

Figure 7:
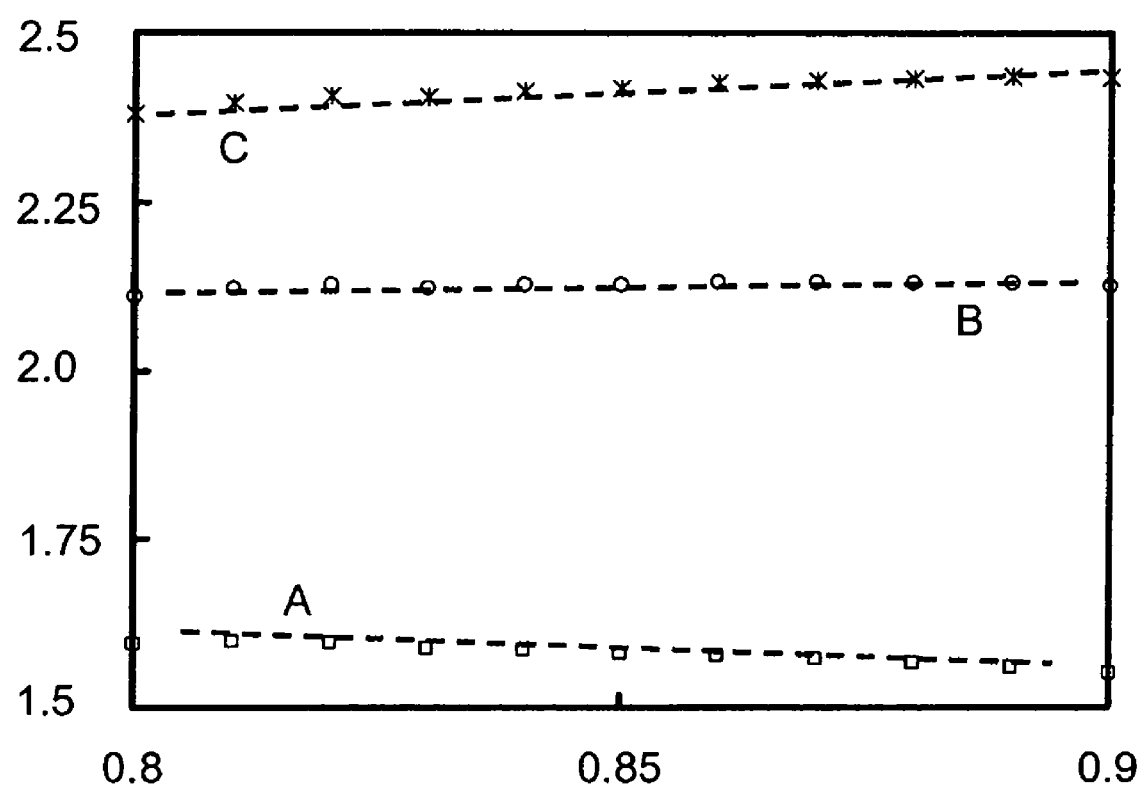

FIG. 7 Graph of the product $I_{Cmi} \times \exp(-qV_{EBmi}/kT_a)$ (ordinate axis) using the pair of data ($V_{EBmi}$, $I_{Cmi}$) of FIG. 6, as a function of the emitter-base forward bias voltage, $V_{EB}$ (abscissa axis). Pairs of data obtained while the GaInP/GaAs hetero-junction bipolar transistor was in thermal equilibrium with the body whose temperature should be measured. The before said product, $I_{Cmi} \times \exp(-qV_{EBmi}/kT_a)$, has been realized and plotted for three different values of the absolute temperature; $T_a$, that should be proposed in equation (5). The used values are; T=408.5 K, curve (A), in the figure, T=413.6 K, curve (B) and T=415.8 K, curve (C), in the figure. The dotted lines in the figure are just to guide the eye. It should be remarked that only the graph of $I_{Cmi} \times \exp(-qV_{EBmi}/kT_a)$ obtained for $T_a$=413.6 K, is parallel to the $V_{EB}$ axis. For the other two temperature proposed values, the graph has a slope different of zero.

Figure 8:
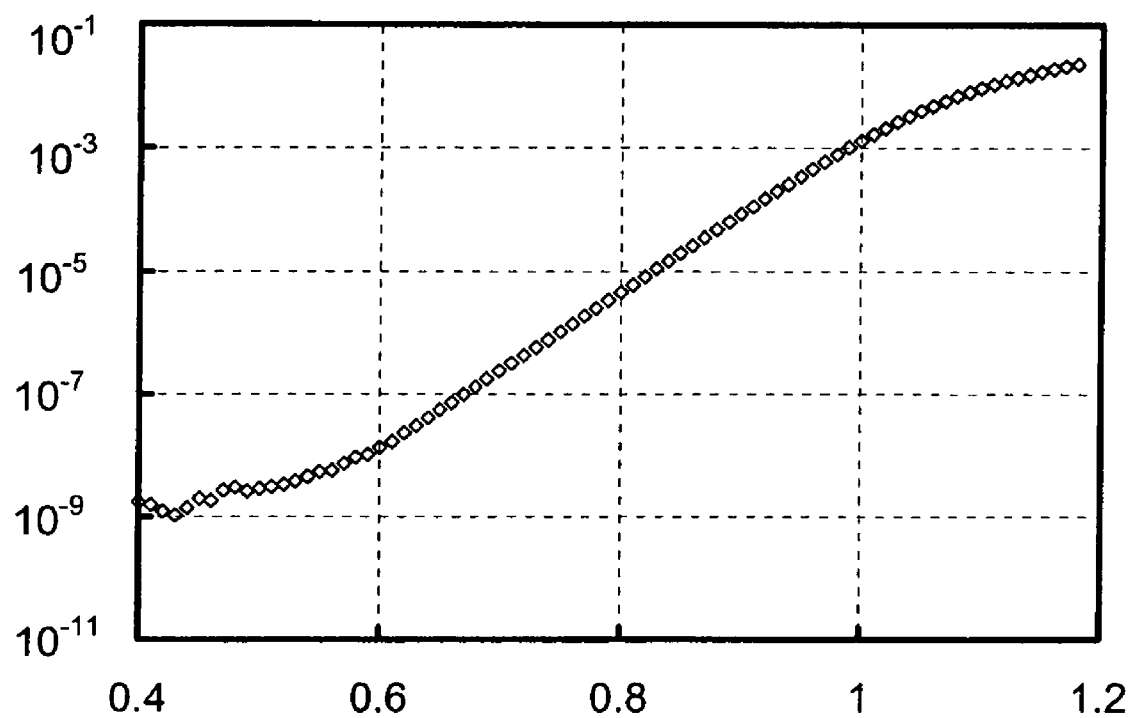

FIG. 8 This graph shows the collector current, $I_C$ (ordinate axis) as a function of the emitter-base forward bias, $V_{EB}$, (abscissa axis), for a bipolar transistor that has been degraded loosing its ability to amplify electrical signals, having a current gain lower than one, The transistor current gain at room temperature is 0.98.

Figure 9:
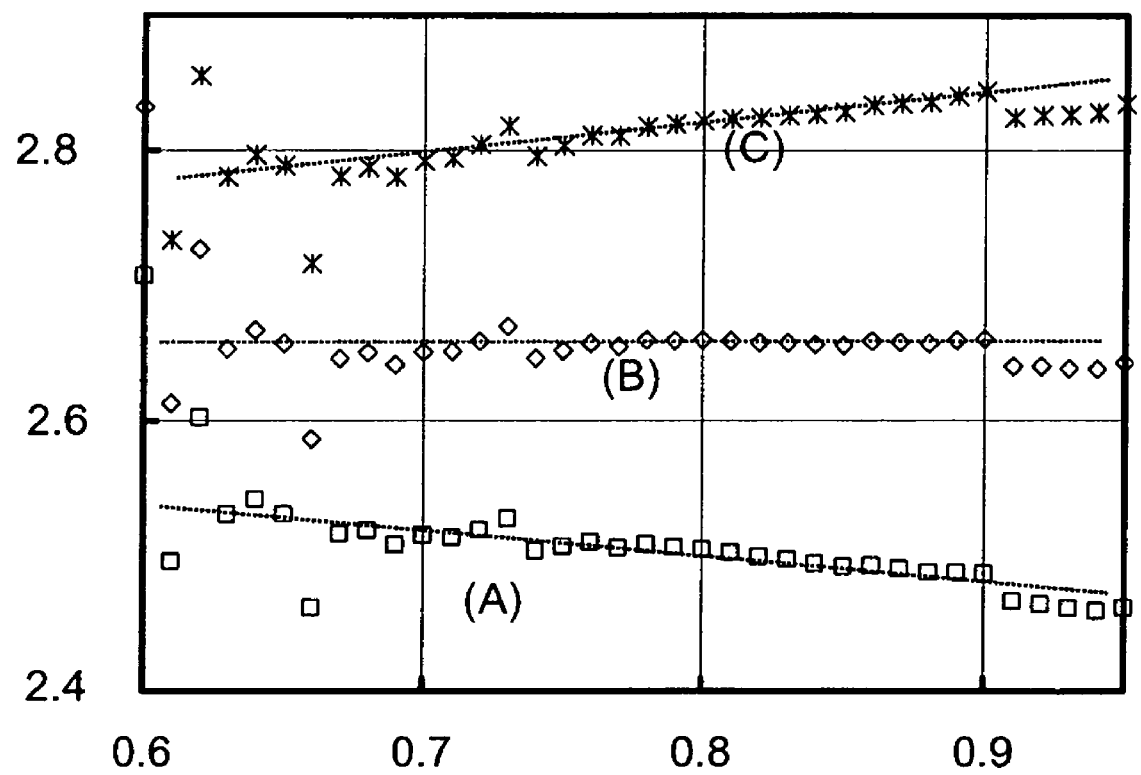

FIG. 9 Graph of the product $I_{Cmi} \times \exp(-qV_{EBmi}/kT_a)$ (ordinate axis) using the pair of data ($V_{EBmi}$, $I_{Cmi}$) of FIG. 8, as a function of the emitter-base forward bias voltage, $V_{EB}$, (abscissa axis). Pairs of data obtained while the degraded bipolar transistor was in thermal equilibrium with the body whose temperature should be measured. The before said product, $I_{Cmi} \times \exp(-qV_{EBmi}/kT_a)$, has been realized and plotted for three different values of the absolute temperature; $T_a$, that should be proposed in equation (5). The used values are; T=392.9 K, curve (A), in the figure, T=393.9 K, curve (B) and T=394.9 K, curve (C), in the figure. The dotted lines in the figure are just to guide the eye. It should be remarked that only the graph of $I_{Cmi} \times \exp(-qV_{EBmi}/kT_a)$ obtained for $T_a$=393.9 K, is parallel to the $V_{EB}$ axis. For the other two temperature proposed values, the graph has a slope different of zero.

Figure 10:
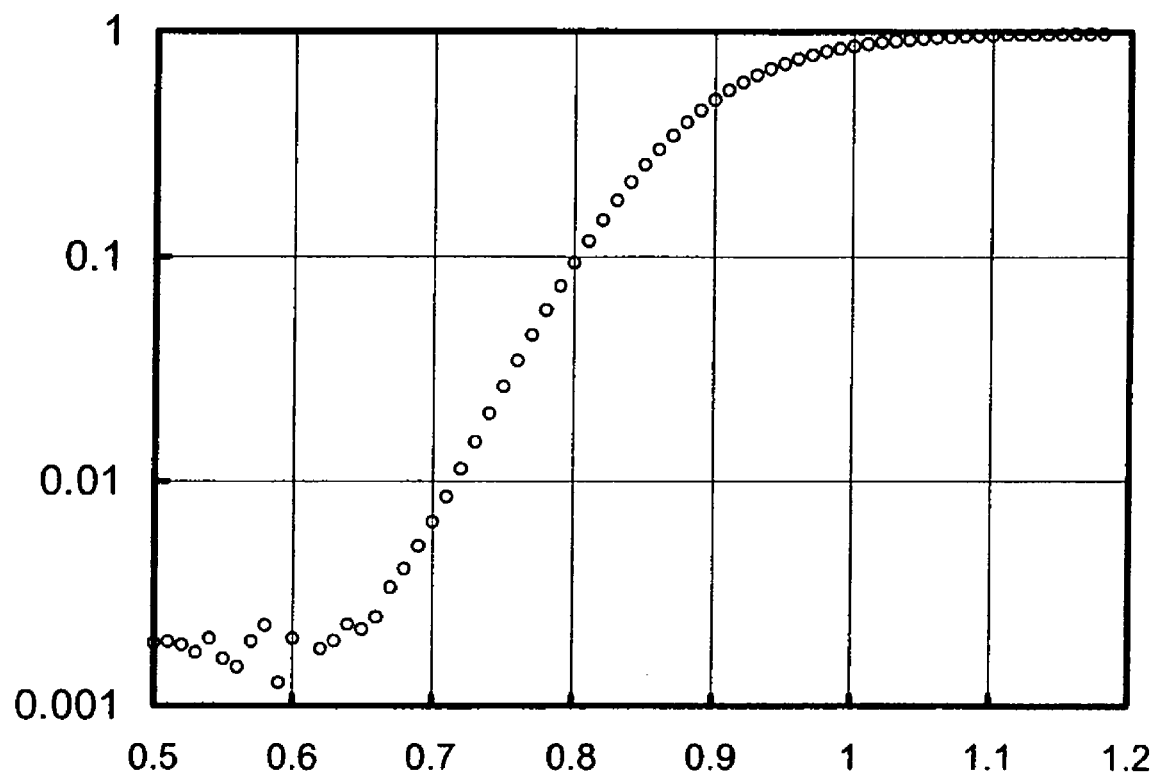

FIG. 10 Graph of the bipolar transistor current gain (ordinate axis) as a function of the emitter-base forward bias voltage used for obtaining the data plotted in FIGS. 8, and 9, having a room temperature current gain smaller than 1.0.

OBJECTIVES OF THE INVENTION

The present invention is about a method to use a bipolar transistor as a precise temperature sensor and/or self calibrated thermometer. As a bipolar transistor should be understood any electronic device commercially available under such a name or any electronic structure made of semiconducting materials comprising at least three regions, of the said semiconducting materials, of different conductivity type placed in an alternated way, that is to say, resulting on a structure P-N-P or N-P-N, each one of this semiconducting materials regions having its own electrical access or ohmic contact. The here before described structure of semiconducting materials of alternated conductivity type should allow: 1.—That charge could be injected from any one of the charge carrier gases of the external regions, 2.—That, the charge carriers injection occurs towards the central structure region, 3.—That, the before said charge injection be the result of an applied voltage between the external region injecting the charge and the central structure region receiving the injected charge carriers, 4.—That, the injected charge into the structure central region could diffuse through it, 5.—That, the injected charge reaches the third structure region, localized at the opposite side of the injecting structure region, 6.—That, the charge collected by the said third region after being injected from the first one, and diffused through the second one, here before referred, flow through its respective electrode to be externally measured. All the above processes without a particular requirement for the amount of charge collected by the third region, except that it should be measurable using currently available equipment and circuits with this purpose, neither requirement is done for the bipolar transistor current gain. The method here below described that uses a bipolar transistor as temperature sensor and/or self calibrated thermometer is independent, generally, of the bipolar transistor structure and current gain. The said bipolar transistor that will be used as a temperature sensor and/or self calibrated thermometer can be of any type NPN or PNP, as well as to be a homo-junction or a hetero-junction bipolar transistor, for any one of its junctions; emitter-base or base-collector or both of them, might be made of any elementary semiconducting materials or of any semiconducting alloys of any composition to constitute any of the actives or passive regions of the transistor; emitter, base, collector and additional layers to realize the ohmic contact. In the bipolar transistor used as temperature sensor and/or self calibrated thermometer, its different regions, active and passive, can be single crystalline, poly-crystalline, amorphous or combination of them. The bipolar transistor used as sensor of temperature and/or self calibrated thermometer can have any value for its current gain and even current gain values lower than 1.0. The here proposed method is such that neither emitter, base and collector parasitic resistances nor parasitic parallel shunt resistances introduce significant errors in the value of the temperature to be sensed or measured and by this fact it is immune to their evolution by use. Because of this physical property, this method is particularly useful when high temperatures are to be monitored or when temperatures should be monitored in harsh environments that might induce changes in the physical properties of the pn junctions of the bipolar transistor being used as a thermometer. The determination of the bipolar transistor operating temperature and that of its surroundings, with which the said bipolar transistor should be in thermal equilibrium, is done according to the following steps; A set of collector current values, $I_{Ci}(V_{EBi})$ as a function of the emitter-base forward bias voltage, $V_{EBi}$, should be obtained, for a proper value of the base-collector voltage. Then, a graph of the product $I_{Ci} \times \exp(-qV_{EBi}/kT_0)$, as a function of $V_{EBi}$ should be done, where $T_0$ is the only absolute temperature value for which, the before mentioned graph has a region that is a straight line having a slope value equal to zero, that is to say, that it results to be parallel to the ordinate axis, $V_{EB}$. $T_0$ is the absolute temperature value of the bipolar transistor and that of the physical medium with which it is in thermal equilibrium. To obtain the temperature value in Celsius degrees, it should be subtracted to the obtained absolute temperature the quantity 273.16, and to obtain the temperature value in Fahrenheit degrees to make the respective transformation.

DETAILED DESCRIPTION OF THE INVENTION

The method to use a bipolar transistor as a temperature sensor and/or self-calibrated thermometer is based on the fact that for a bipolar transistor that is operated at an absolute temperature $T_m$, when the collector current $I_{Cim}(V_{EBmi})$ is measured experimentally as a function of the emitter-base forward bias voltage $V_{Ebmi}$, for a convenient reverse bias of the base-collector junction, follows an equation of the type $$I_{Ci}(V_{EBi}) = I_{DS}(T_m) \times \exp[q(V_{EBi} - R_S I)/kT_m] + R_P/(V_{EBi} - I_{Ci}R_S) \quad (3)$$

where I represent the i-th value for the forward emitter-base voltage applied for the said bipolar transistor that produces the i-th collector current. $T_m$ represents the absolute temperature value at which the bipolar transistor is being operated while the measurements to get the collector current and emitter-base forward bias data pairs are done, the remaining terms have been defined before. In equation (3) the term related to the recombination of minority carriers in the space charge region of the pn junction does not appear, as it does in equation (1). This is because in this transistor operating condition it results that through the base-collector junction only flows the current due to the thermal diffusion of minority carriers injected through the emitter-base junction. Because of that the ideality factor takes the value 1.0. By this way the problem of a changing ideality factor is eliminated.

Then, in this method to measure the temperature should be proceeded as follows:

1) To put the bipolar transistor to be used as thermometer on proper thermal contact with the body or physical medium whose temperature is going to be measured.

2) Obtain, for the above mentioned bipolar transistor to be used as temperature sensor and/or as self-calibrated thermometer, a set of data pairs; $(V_{EBmi}, I_{Cmi})$, that means that each pair of data should be constituted by; the forward bias voltage applied between the emitter-base electrodes of the bipolar transistor, $V_{EBi}$ and the corresponding electric current circulating through the collector electrode, $I_{Ci}$, keeping the base-collector junction non polarized or with some reverse polarization, while the electric current flowing through this junction is measured. Where i represent the i-th value for the forward emitter-base voltage applied for the said bipolar transistor that produces the i-th collector current.

3) In the next step it should be obtained, using the previously obtained set of data pairs $(V_{EBmi}, I_{Cmi})$, a second set of data pair, where each new data couple should be formed by the first term of the previous data pair, that means, $V_{EBmi}$, that is to say the value of the forward bias voltage between emitter and base that produced the current $I_{Cmi}$. The second term is the result of multiplying $I_{Cmi}$ by the quantity $\exp(-qV_{EBmi}/kT_a)$, that is to say, $(I_{Cmi}) \times [\exp(-qV_{EBmi}/kT_a)]$, where q represent the electron charge, k the Boltzmann's constant and $T_a$ is an absolute temperature value that is an adjusting parameter, whose proper value should be obtained according to the statement 6) below.

4) The value of absolute temperature $T_a$ introduced in the precedent statement is an adjusting parameter allowing, through the procedure described in the statement 6) below, the determination of the temperature to be measured.

5) Next, should be constructed the graph of $(I_{Cmi}) \times [\exp(-qV_{EBmi}/kT_a)]$, ordinate, as a function of $V_{EBmi}$, abscissa, using the second set of pairs of data obtained in the statement 3).

6) Then, it should be determined the value of the adjusting parameter $T_a$, introduced in statement 3) above that allows to obtain a part of the graph constructed in the precedent statement 5), to be a straight line having a slope value equal to zero, i.e., that should be parallel to the abscissa axis, where the $V_{EBmi}$ values have been recorded. If the $T_a$ proposed value is different of $T_m$, the transistor temperature value at the acquisition data time, the part of the said graph that is a straight line will have a value slope different of zero, i.e., it will not be parallel to the $V_{EB}$ axis.

7) The particular value of $T_a$ for which the mathematical condition established in the statement 6) before, is completely fulfilled, corresponds to the value of the absolute temperature at which the bipolar transistor is functioning at the time when the data $V_{EBim}$, and $I_{Cmi}$ are acquired and thus is, as well, the temperature of the body or physical medium, with which the said bipolar transistor used as temperature sensor or thermometer is in thermal equilibrium.

The proposition in the statement 3) to make the multiplication of the experimental collector current data $I_{Cmi}(V_{EBmi})$ by the quantity given by the equation $$\exp(-qV_{EBmi}/kT_a) \quad (4)$$

that is to say, to realize the mathematical operation $I_{Cmi} \times \exp(-qV_{EBmi}/kT_a)$ where $I_{Cmi}(V_{EBmi})$ is the collector current previously measured while an emitter-base forward bias voltage $V_{EBmi}$ is applied and $T_a$ is an absolute temperature, initially of arbitrary value, leads to the following situation. The just before described mathematical operation, when the law that rules $I_{Cmi}(V_{EBmi})$ is considered, results:

$$I_{Cmi} \times exp(-qV_{EBmi}/kT_a) = I_{DS} exp[qV_{EBmi}(T_a-T_m)/k(T_m T_a)] exp[-qR_S I_{Cmi})/kT_m] + [R_P/(V_{EBmi}-I_{Cmi}R_S)] \times exp(-qV_{EBmi}/kT_a) \quad (5)$$

However, as said before, there is a collector current range $I_C$ where only the first term of the right hand side of equation (5) has a meaning value, if additionally $R_S I_{Ci} \ll kT_m$, the equation (5) reduces to $$I_{Cmi} \times exp(-qV_{EBmi}/kT_a) = I_{DS} exp[qV_{EBmi}(T_a-T_m)/k(T_m T_a)] \quad (6)$$

By this way it is obtained that if, and only if, the proposed temperature $T_a$ in equations (5), has the same temperature value at which the bipolar transistor was operated while the experimental data of $I_{Cmi}$ were obtained, the product stated in equation (6), takes a constant value equal to the preexponential term $I_{DS}$ of equation (6), that is to say $$I_{Ci} \times exp(-qV_{EBi}/kT_a) = I_{DS} \quad (7)$$

That is why, when a graph of equation (6), as a function of $V_{EB}$ is constructed, as established in the statement 5) above, a graph containing a zero slope straight line portion, that is, parallel to the $V_{EB}$ axis is obtained.

Nevertheless if a $T_a$ value different of $T_m$, the true actual temperature at which the transistor was while the data were obtained, the above portion of the straight line will have a slope different of zero. As illustrated by the FIGS. 2, 4, 5, 7 and 9.

The FIGS. 1 to 10 illustrate the use of this method, but by no way, it is limited to these cases. To illustrate the use of the method here proposed, four cases have been choose as application examples; a homojunction Germanium bipolar transistor (Ge), a homojunction Silicon bipolar transistor (Si), a degraded transistor having a current gain lower than 1.0, and finally a heterojunction bipolar transistor of the III-V family, all of them commercial devices.

EXAMPLE 1

In the first example, FIGS. 1 and 2, it has been used a commercial Germanium bipolar transistor. With it the temperature of a body with which it was in thermal equilibrium was measured. FIG. 1 shows the graph of the collector current $I_{Cmi}(V_{EBmi})$ as a function of the applied emitter-base forward bias $V_{EB}$.

The FIG. 2, shows is the graph of the product $I_{Cmi} \times exp(-qV_{EBmi}/kT_a)$ for the collector current data set of, $I_{Cmi}(V_{EBmi})$ as a function of $V_{EB}$, such as is described in the section "DETAILED DESCRIPTION OF THE INVENTION". In the realization of FIG. 2, to illustrate in detail the here proposed method, three different values of the adjusting parameter $T_a$, that should be proposed in equation (5), have been used, getting by this way three curves (A, B and C) respectively. Each one of these curves comprises a part that is a straight line and each one of those straight lines is characterized by its own slope different from each other. However, there is ONE, AND ONLY ONE, of those straight lines resulting with a slope equal to ZERO, that is to say, parallel to the $V_{EB}$ axis, and it is just the $T_a$ value used in getting the particular set of data that yield this curve that corresponds to the bipolar transistor temperature while the collector current data were get, that is to say 240.7 K.

EXAMPLE 2

The FIG. 3 demonstrates the application of this method using a silicon bipolar transistor featuring emitter-base and base-collector homo-junctions, its room temperature current gain being 210. In this case two temperatures were measured, one lower than the room temperature and the other close to the room temperature. Then, as it has been established, the set of data for the collector current as a function of the forward bias emitter-base voltage was obtained; $I_{Cmi}(V_{EBmi})$, separately for each one of the temperatures to be measured. FIGS. 4 and 5 illustrate anew the graphs of the products $I_{Cmi} \times exp(-qV_{EBmi}/kT_a)$ as a function of $V_{EB}$, for each one of the collector current data set. As in the first example here presented, in each one of those figures is shown the graph of the obtained product for three proposed values for $T_a$, with the aim of illustrate again that it is ONE, AND ONLY ONE, that leads to a graph slope equal to ZERO, that is the one which corresponds to the bipolar transistor temperature while the collector current data were get, that is to say, 118.7 and 279 K for FIGS. 4 and 5 respectively.

EXAMPLE 3

In this example it has been used a commercial bipolar transistor constituted by semi-conducting materials of the so called III-V family, having the GaInP—GaAs hetero-junction as the emitter-base junction and a homo-junction GaAs—GaAs as the base-collector junction.

The FIG. 6 shows the graph of the collector current $I_C(V_{EB})$ as a function of the forward bias emitter-base voltage, $V_{EB}$. FIG. 7 shows the graph of the product $I_{Cmi} \times exp(-qV_{EBmi}/kT_a)$ as a function of $V_{EBmi}$, for the data set of $I_C(V_{EB})$ as a function of the forward bias emitter-base voltage $V_{EB}$, such as is described in the section "DETAILED DESCRIPTION OF THE INVENTION". In the realization of FIG. 7, to illustrate in detail the here proposed method, three different values of the adjusting parameter $T_a$, that should be proposed in equation (5) have been used, obtaining by this way three curves (A, B and D) respectively.

Each one of these curves comprises a part that is a straight line and each one of those straight lines is characterized by its own slope that is different from each other. However, there is ONE, AND ONLY ONE, of those straight lines resulting with a slope equal to ZERO, that is to say parallel to the $V_{EB}$ axis, and it is just the $T_a$ value used in getting the particular set of data that yield this curve that corresponds to the bipolar transistor temperature while the collector current data were get, that is to say 413.6 K.

EXAMPLE 4

This case illustrates the method for a degraded bipolar transistor that has loose its current gain to a value lower than 1.0 (the current gain of this bipolar transistor as a function of the emitter-base forward voltage is shown in FIG. 10). FIG. 9 shows the graph of the product $I_{Cmi} \times exp(-qV_{EBmi}/kT_a)$ for the set of data $I_{Cm}(V_{EBmi})$ as a function of $V_{EB}$, such as is described in the section "DETAILED DESCRIPTION OF THE INVENTION". In the realization of FIG. 9, to illustrate in detail the here proposed method, three different values of the adjusting parameter $T_a$, that should be proposed in equation (5) have been used, obtaining by this way three curves (A, B and C) respectively. Each one of these curves comprises a part that is a straight line and each one of those straight lines is characterized by its own slope that is different from each other. However, there is ONE, AND ONLY ONE, of those straight lines resulting with a slope equal to ZERO, that is to say parallel to the $V_{EB}$ axis, and it is just the $T_a$ value used in getting the particular set of data that yield this curve that corresponds to the bipolar transistor temperature while the collector current data were get, that is to say 393.92 K.

Having described this invention what I claim is:

1. A method of measuring temperature of a body or physical medium precisely, comprising thermally contacting the body or physical medium with a self-calibrating thermometer, the thermometer comprising a bipolar transistor formed of any semiconducting materials, said bipolar electronic structure comprising at least three regions of the said semiconducting materials of different conductivity type placed in an alternated way resulting in any one of two bipolar junction structures: P-N-P or N-P-N, each one of the semiconducting materials regions having an electrical contact, such that charge carriers are injected from the free charge carrier gas of either one of the external regions of the three regions, into a structure central region of the three regions, said charge carriers are injected as a result of an applied voltage across the external region injecting the charge carriers and the central structure region receiving the injected charge carriers, and the injected charge carriers diffuse through the structure central region reaching a third region of the three regions at an opposite end of the injecting structure region, where the charge carriers are collected by the said third region, said method comprising obtaining data and applying it to the following equation $$I_{Cmi} \times \exp(-qV_{EBmi}/kT_a)$$

to determine a bipolar transistor temperature by application of the data to the equation, where $I_{Cmi}(V_{EBmi})$ is a collector current measured while the applied voltage is an emitter-base forward bias voltage $V_{EBmi}$, and $T_a$ is a parameter having absolute temperature units, q is the electron charge, k is the Bolztmann's constant, and wherein the data is obtained and the temperature of the body or physical medium is determined as follows:

a) obtaining, by using automated equipment, a set of data pairs ($V_{EBmi}$, $I_{Cmi}$), comprising:

the forward bias voltage applied between emitter-base electrodes of the electrical contacts of the bipolar transistor, $V_{EBi}$, and a corresponding collector current flowing through a collector electrode which is one of said electrical contacts disposed on said third region, the collector current being $I_{Ci}$, while keeping the base-collector junction non polarized or with some reverse polarization while the electric current flowing through this junction is measured, where i represents the i-th value for the forward emitter-base voltage applied for the said bipolar transistor, that produces the i-th collector current, b) obtaining, by using said automated equipment and the previously obtained set of said data pairs ($V_{EBmi}$, $I_{Cmi}$), a second set of data pairs comprising:

a first term of a corresponding pair of the previous data pair, $V_{EBmi}$, which is a value of the forward bias voltage between emitter and base that produced the collector current $I_{Cmi}$, and a second term which is a result of multiplying $I_{Cmi}$ by a quantity $\exp(-qV_{EBmi}/kT_a)$, so as to correspond to $(I_{cm}) \times [\exp(-qV_{EBmi}/kT_a)]$, where q represents the electron charge, k is the Bolztmann's constant and $T_a$ is an absolute temperature value that is an adjusting parameter obtained according to a following operation d);

c) constructing, by using said automated equipment, a graph of $(I_{Cmi}) \times [\exp(-qV_{EBmi}/kT_a)]$, along an ordinate, as a function of $V_{EBmi}$, along an abscissa, using the second set of data pairs obtained in the operation b);

d) determining, by using said automated equipment, a value of the adjusting parameter $T_a$, introduced in operation b), so as to produce a part of the graph constructed in the operation c) as a straight line having a slope equal to zero such that the straight line is parallel to the abscissa axis along which the $V_{EBmi}$ values have been recorded; and e) outputting, by using said automated equipment, the value of $T_a$ obtained in operation d) as the value of absolute temperature at which the bipolar transistor is functioning at the time at which the data $V_{EBmi}$, and $I_{Cmi}$ are obtained as well as the temperature of one of the body or physical medium at thermal equilibrium with the bipolar transistor.

2. The method of measuring temperature of a body or physical medium precisely according to claim 1, wherein the method uses as the bipolar transistor either type of bipolar transistors NPN or PNP, each comprising homojunctions or heterojunctions at any one of their PN junctions thereof or a combination of both.

3. The method of measuring temperature of a body or physical medium precisely according to claim 1, wherein the bipolar transistor is made out of any of elementary semiconducting materials obtained using any of the group of Silicon, Germanium or Carbon or any alloys of elements of the group.

4. The method of measuring temperature of a body or physical medium precisely according to claim 1, wherein the bipolar transistor is made out of any compound semi-conducting materials obtained using any of the group of GaAs, InP, InSb, GaN, AlN, InN, InAs, or any alloy of elements of the group.

5. The method of measuring temperature of a body or physical medium precisely according to claim 1, wherein the bipolar transistor is one of a discrete device, part of an integrated circuit, part of a hybrid circuit, or part of an electronic system developed to sense and determine temperature according to this method.

6. The method of measuring temperature of a body or physical medium precisely according to claim 1, wherein the $T_a$ value and the $V_{EB}$ values region for which the mathematical condition that the graph of $(I_{Cmi}) \times [\exp(-qV_{EBmi}/kT_a)]$ as a function of $V_{EB}$ has a slope value equal to zero is satisfied are obtained.

7. The method of measuring temperature of a body or physical medium precisely according to claim 1, wherein the bipolar transistor is part of an integrated circuit of either of bipolar or MOS construction or a construction of both bipolar and MOS structures.

* * * * *